(12) United States Patent
Zhang et al.

(10) Patent No.: US 11,556,120 B2
(45) Date of Patent: Jan. 17, 2023

(54) SYSTEMS AND METHODS FOR MONITORING PERFORMANCE OF A BUILDING MANAGEMENT SYSTEM VIA LOG STREAMS

(71) Applicant: Honeywell International Inc., Morris Plains, NJ (US)

(72) Inventors: Weilin Zhang, Beijing (CN); ZhenJun Mei, Beijing (CN); He Du, Beijing (CN); Jizhen Li, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 473 days.

(21) Appl. No.: 16/667,620

(22) Filed: Oct. 29, 2019

(65) Prior Publication Data

US 2020/0133252 A1  Apr. 30, 2020

Related U.S. Application Data

(60) Provisional application No. 62/752,304, filed on Oct. 29, 2018.

(51) Int. Cl.
| | |
|---|---|
| *G05B 23/02* | (2006.01) |
| *G06F 16/906* | (2019.01) |
| *G06F 16/903* | (2019.01) |
| *G05B 15/02* | (2006.01) |

(52) U.S. Cl.
CPC ......... *G05B 23/0264* (2013.01); *G05B 15/02* (2013.01); *G05B 23/0221* (2013.01); *G06F 16/906* (2019.01); *G06F 16/90335* (2019.01)

(58) Field of Classification Search
USPC ....................................................... 702/182
See application file for complete search history.

(56) References Cited

U.S. PATENT DOCUMENTS

| | | | |
|---|---|---|---|
| 5,961,596 | A  | 10/1999 | Takubo et al. |
| 8,731,724 | B2 | 5/2014  | Drees et al. |
| 9,485,317 | B2 | 11/2016 | Cai et al. |
| 9,584,374 | B2 | 2/2017  | Bingham et al. |

(Continued)

FOREIGN PATENT DOCUMENTS

CN          107943649 A      4/2018

OTHER PUBLICATIONS

Apache Cassandra, What is Cassandra?, The Apache Software Foundation, pp. 3, 2016.

(Continued)

*Primary Examiner* — Paul D Lee
(74) *Attorney, Agent, or Firm* — Seager, Tufte & Wickhem, LLP

(57) ABSTRACT

Methods and systems for monitoring the performance of a building management system by analyzing log files of various modules of the building management system. A user request is received at a first one of the plurality of modules of the building management system, which initiates a sequence of messages processed by two or more modules. Each of the sequence of messages include a common tag value that corresponds to the user request. Each of the plurality of modules that process one of the sequence of messages logs the corresponding message including the common tag value in a corresponding log entry. The log entries are analyzed to identify resource utilization of at least some of the plurality of modules.

20 Claims, 6 Drawing Sheets

(56) References Cited

U.S. PATENT DOCUMENTS

| | | | |
|---|---|---|---|
| 9,990,383 B2 | 6/2018 | Brinnand | |
| 11,226,964 B1* | 1/2022 | Cairney | G06F 16/2379 |
| 2006/0277206 A1* | 12/2006 | Bailey | G06F 11/3409 |
| | | | 707/999.102 |
| 2008/0288215 A1 | 11/2008 | Duberry | |
| 2016/0261425 A1* | 9/2016 | Horton | G06F 9/546 |
| 2017/0102693 A1* | 4/2017 | Kidd | G05B 19/41875 |
| 2018/0081562 A1* | 3/2018 | Vasudevan | G06F 12/0875 |
| 2018/0157713 A1* | 6/2018 | Huang | G06F 16/24568 |
| 2019/0095817 A1* | 3/2019 | Ma | G06F 7/08 |
| 2019/0220338 A1 | 7/2019 | Ranganathan et al. | |

OTHER PUBLICATIONS

Apache Kafka, A distributed streaming platform, pp. 5, 2017.
Apache Flume, "Flume 1.9.0 User Guide," https://flume.apache.org/releases/content/1.9.0/FlumeUserGuide.html, pp. 52, copyright 2009-2019.

* cited by examiner

SYSTEMS AND METHODS FOR MONITORING PERFORMANCE OF A BUILDING MANAGEMENT SYSTEM VIA LOG STREAMS

CROSS-REFERENCE TO RELATED APPLICATIONS

This application claims the benefit under 35 U.S.C. § 119(e) of U.S. Provisional Application No. 62/752,304, filed Oct. 29, 2018, which is incorporated herein by reference.

TECHNICAL FIELD

This disclosure relates generally to the operation of building management systems. More specifically, this disclosure relates to systems and methods for monitoring performance of building management systems.

BACKGROUND

Building management systems (BMS) are routinely used to monitor, control, and/or automate building controls, which may include security systems, surveillance systems, environment control systems, etc. In some cases, modules of a BMS used to operate building control devices may make entries into a data log for each at least some actions taken by the modules. In many cases, the various modules of a BMS produce large amounts of log data related to the various actions taken by the various BMS modules.

SUMMARY

This disclosure is directed towards the operation of building management systems, and more particularly, to systems and methods for monitoring performance of building management systems. More specifically, the disclosure provides improvements in techniques and systems for monitoring building management systems using log data from the various BMS modules.

In one example, a method and system of monitoring performance of a building management system is provided, where the building management system may include a plurality of modules that each may produce log data. The method may include receiving a user request at a first one of the plurality of modules of the building management system. Receiving the user request may initiate a sequence of messages that are passed between and processed by two or more of the plurality of modules along a request data path beginning with the first one of the plurality of modules. Each of the sequence of messages may be configured to include a common tag value that corresponds to the user request and that is generated by the first one of the plurality of modules. Each of the plurality of modules that process one of the sequence of messages may log the processing of the corresponding message in a log entry in log data produced by the corresponding module. The log entry may include the common tag value along with a timestamp. The method may further include analyzing the log data from each of the plurality of modules that process one of the sequence of messages to identify resource utilization of at least some of the plurality of modules that process one of the sequence of messages along the request data path.

In another example, a monitoring system for monitoring performance of a building management system is provided. The monitoring system may include a plurality of modules operative coupled to a building control system. The plurality of modules may be configured such that when a first one of the plurality of modules receive a user request from a user, the first one of the plurality of modules initiates execution of the user request along a request data path to the building control system. The execution of the user request may include a sequence of messages that are each passed between two corresponding ones of the plurality of modules along the request data path. Each of the sequence of messages may include a common tag value that is unique to and corresponds to the particular user request. Each of the plurality of modules may log the corresponding message in a log entry in log data produced by the corresponding module. The log entry may include the common tag value along with a time stamp. A monitoring module may be operatively coupled to the plurality of modules for analyzing the log data from each of the plurality of modules to identify resource utilization of at least some of the plurality of modules along the request data path.

In another example, a method of monitoring performance of a building management system is provided, where the building management system includes a plurality of modules for processing a user request and each of the plurality of modules produce log data. The method may include receiving at a log data collection module log data from each of one or more log adapters. The one or more log adapters convert the log data from a corresponding one of the plurality of modules to one or more file formats readable by the log data collection module. The method may further include filtering the of log data using the log data collection module. The log data may be filtered into one of a first group of data that is to be stored directly in a searchable database and a second group of data that is to be further analyzed before being stored in the searchable database. The method may further include sending the second group of data via a sink adapter to a streaming data analysis engine, and analyzing the second group of data using the streaming data analysis engine. In some cases, the results of the analysis may provide one or more execution time values that correspond to an execution time at each of two or more of the plurality of modules. The one or more execution time values may be logged in to the searchable database.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
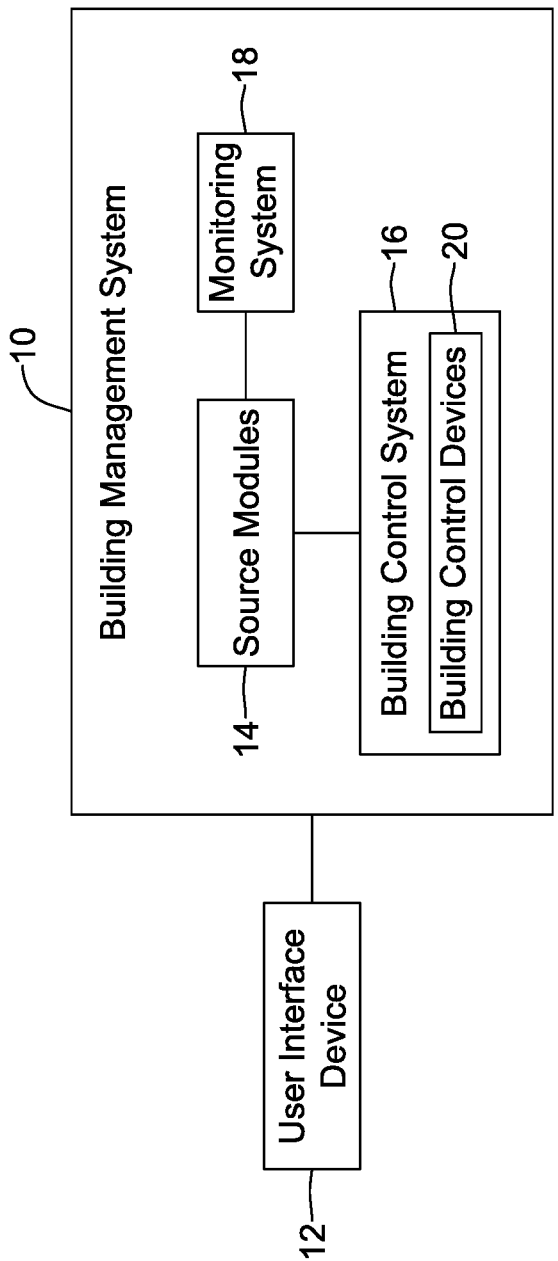
FIG. 1 is a schematic block diagram of an illustrative building management system and illustrative user interface device.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

Building management systems may include a building control system having one or more building control devices in one or more buildings. In some cases, the building control devices may be installed at an installation site of a building. Building control devices may include any suitable building control devices configured to facilitate control of one or more building-related functions. Building control devices may include, but are not limited to, a light controller, a thermostat, surveillance system components, heating, ventilation, and air conditioning (HVAC) components, security system components, fire protection components, etc.

In some cases, the building control devices may be configured to operate entirely off-line. Alternatively, the building control devices may be configured to operate and/or communicate with other computing devices over one or more local area and/or wide area computer networks.

In some cases, one or more of the building control devices may be Internet Protocol (IP) connectable building control devices configured to communicate over an IP network, such as the Internet. In some cases, one or more of the building automation devices may not itself be an IP connectable building control device, but may be configured to communicate with an IP connectable building control device via a wired or wireless interface. In some cases, building control devices may be controlled via software on a public/private cloud platform (e.g., a cloud server or other suitable computing device).

In order to help ensure a distributed system that includes computing devices that communicate and coordinate their actions by passing messages (such as some building management systems) is operating efficiently, it may be desirable to monitor the performance of the computing devices and/or modules therein. In a building management system, a typical control scenario may include a user setting a set point value via web page or internet connected application, the setting of the set point may produce a request to set the specified set point via a RESTful service (e.g., a representational state transfer service) the produces a message to a message queue. A data acquisition module may consume the message from the message queue and send a message/command to a building control device or other third party system. The result of the message/command may be provided by the building control device or other third party system back to a data acquisition (DAQ), to a message queue, through a web socket and back to the webpage or internet connected application. Each computing device or micro-service thereon may produce log data. In some cases, the log data produced by each computing device or micro-service thereon may be in a particular format. The disclosed concepts provide systems and techniques for managing log data produced by the various modules of the building management system, and using the log data to monitor the performance of various modules of the building management system.

FIG. 1 schematically depicts an illustrative building management system 10 and a user interface device 12, which may be used by a user (not shown) to interact with the building management system 10. The building management system 10 and the user interface device 12 may each include or utilize one or more network connected computing devices.

The user interface device 12 may include one or more of a display device, a touch screen device, a mobile device, a smartphone, a tablet computer, a laptop computer, a desktop computer, a network connectable wearable devices, etc. Further, the user interface device 12 may include or may be network connected or connectable to a computing device including computer readable instructions (e.g., software) configured to interact with one or more components of the building management system 10.

The building management system 10 may include one or more source modules 14, one or more building control systems 16, a monitoring system 18, and/or one or more other suitable components and/or systems. Although the source modules 14, the building control system 16 and the monitoring system 18 are depicted in FIG. 1 as separate components, one or more of the source modules 14, the building control system 16, and the monitoring system 18 may be combined into a single component, as desired.

The source modules 14 may be any suitable type of module configured to receive a request from a user (e.g., a user request via the user interface device(s) 12 and/or other suitable user requests), initiate a sequence of messages that may be passed between and/or processed by the source modules 14 of a request data path used to respond to the user request, and/or pass and/or process one or more messages of a sequence of messages initiated in response to the user request. Example source modules may include, but are not limited to, micro-services, application programming interface (API) gateways, web applications, webpages, device applications, etc.

The building control system 16 may include one or more building control devices 20. The one or more building control devices 20 may be connected to a local area network (LAN and/or a wide area network (WAN) (e.g., the Internet). In some cases, the building control devices 20 may be configured to communicate with a server and/or other suitable computing device(s) to pass data from building control devices 20 to a user, service (e.g., a micro-service), the monitoring system, and/or other suitable component, receive software updates, receive control instructions/signals (e.g., via the user interface device 12 and/or other suitable components), and/or communicate other suitable data, instructions, and/or information. The server and/or other computing devices may include one or more components of the building control system 16, one or more source modules, 14, one or more components of the monitoring system 18, and/or one or more other suitable components.

The building control devices 20 may be any suitable type of device configured to facilitate control of one or more building functions. In some cases, the building control devices 20 may include a computing device having a processor, memory, an input/output (I/O) unit (e.g., which may include a communications unit), and/or other suitable components (e.g., as discussed in greater detail below with respect to FIG. 2).

The monitoring system 18 may be any suitable type of system configured to monitor the building control system 16. In some cases, the monitoring system 18 may include one or more computing devices and/or processor executable instructions configured to monitor operations of the building control system 16 including the performance of one or more aspects of the building control system 16.

Figure 2:
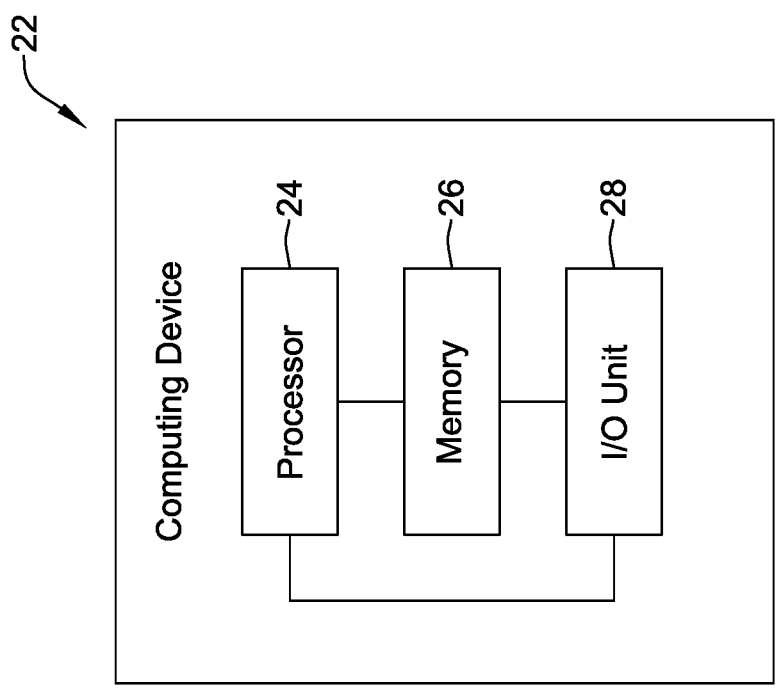
FIG. 2 is a schematic diagram of an illustrative computing device.

FIG. 2 depicts a schematic block diagram of an illustrative computing device 22, the components of which may be incorporated in and/or utilized by one or more of the user interface devices 12, the source modules 14, the monitoring system 18, the building control devices 20, one or more other components of the building management system 10, and/or more other components configured to communicate or facilitate communication with the building management system 10. In one example, the user interface device 12 may be or may include one or more computing devices 22. In another example, the building control devices 20 may be or may include one or more computing devices 22. In a further example, the monitoring system 18 may be or may include one or more computing devices 22 to communicate the user interface devices 12 and/or the building control system 16, store data related to the user interface devices 12 and/or the building control system 16, and/or for other suitable purposes. Other examples uses of computing devices 22 are contemplated. The illustrative computing device 22 may include, among other suitable components, a processor 24, memory 26, and an I/O unit 28.

The processor 24 of the computing device 22 may include a single processor or more than one processor working individually or with one another. The processor 24 may be configured to execute instructions, including instructions that may be loaded into the memory 26 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 26 of the computing device 22 may include a single memory component or more than one memory component each working individually or with one another. Example types of memory 26 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 26 may be or may include a non-transitory computer readable medium.

The I/O units 28 of the computing device 22 may include a single I/O component or more than one I/O component each working individually or with one another. Example I/O units 28 may be any type of communication port configured to communicate with other components of the building management system 10. Example types of I/O units 28 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Figure 3:
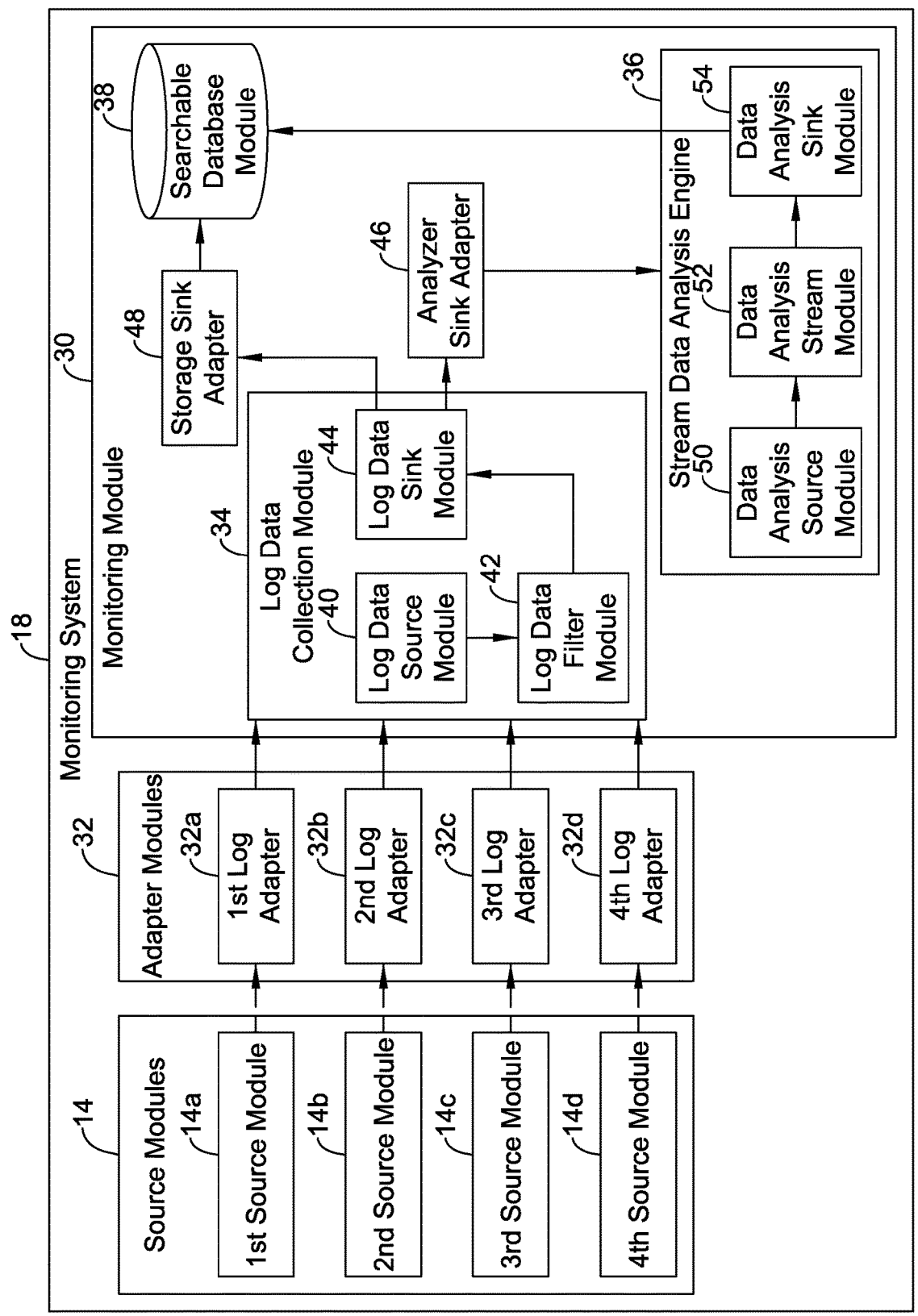
FIG. 3 is a schematic diagram of an illustrative monitoring system.

FIG. 3 depicts a schematic of the illustrative monitoring system 18 of FIG. 1. The illustrative monitoring system 18 may include, among other suitable components, source modules 14, a monitoring module 30, and adapter modules 32 configured to facilitate log data and/or other suitable data transfer between the source modules 14 and the monitoring module 30. Although the source modules 14 are depicted as being part of the monitoring system 18 in FIG. 3, this is not required and one or more of the source modules 14 may be separate from, but otherwise communicate with, the monitoring system 18. Further, although the adapter modules 32 are depicted in FIG. 3 as being separate from the source modules 14 and the monitoring module 30, one or more adapter modules 32 may be configured as being part of one or more of the source modules 14 and/or as being part of one or more of the monitoring module 30.

As depicted in FIG. 3, the source modules 14 may include any number of source modules and in some cases, include a first source module 14*a*, a second source module 14*b*, a third source module 14*c*, and a fourth source module 14*d*. In one example, the first source module 14*a* may be a micro-services source module, the second source module 14*b* may be an API gateway, the third source module 14*c* may be a web application, and the fourth source module 14*d* may be a console applications. The number of source modules 14 in the building management system 10 may be based on various data paths that may be utilized to respond to user requests received at one of the source modules 14. For example, a total number of source modules 14 included in the building management system 10 may include the number of source modules 14 needed to respond to all possible user requests. Example user requests and/or data paths in the building management system realm may include set point set requests, point value requests, API access list requests, alarm history list requests, work order list requests, etc.

When a source module 14 receives a user request, the source module 14 may initiate a sequence of messages that may be passed along a request data path between other modules and/or one or more building control devices 20 (e.g., third party devices and/or other suitable building control devices 20), where the request data path may begin with the source module 14 that receives the user request (e.g., the first source module 14 in the data path). Each message of the sequence of messages along the data path may include a common tag value. The tag value may be assigned by the source module 14 that received the user request and in some cases may be based on a type of user request (e.g., a set point request, etc.).

Each of the source modules 14 that process the one of the sequence of messages may log the processing of the corresponding message in a log entry in a log of the respective source module 14 processing the message. The log entry may include the tag value included in the message associated with the type of user request and/or request data path, along with one or more of a time stamp by the source module 14 processing the message that indicates the time at which message was processed, a sequence number provided by the source module 14 processing the message that may be indicative of a sequence number of the source module 14 along the request data path, and/or one or more other suitable features. Further, in some cases, each log entry may include a source module name, a type of log (e.g., execution log, user log, etc.), a description of a processing of a message at the source module 14, and/or other suitable information relevant to processing the corresponding message. Such information in log entries may facilitate analyzing the log data based on the request (e.g., via organizing the log data via a tag value), based on the source module (e.g., via organizing the log data via a sequence number), and/or based one or more other piece of data in the log entry.

Each of the source modules 14 of the building management system 10 may output log entries as log data. The log data may include all log entries made by an associated source module 14, including those log entries produced in response to processing messages along the request data path and/or other suitable log entries.

The adapter modules 32 may be configured to act as an intermediary between the source modules 14 and the monitoring module 30. The adapter modules 32 may be configured to convert a file format or type (e.g., log4j, logfile, JMS, console, web app, etc.) and/or configuration of the log data output from the source modules 14 into a file configuration and/or file type understandable by components of the monitoring module 30. In some cases, the adapter modules 32 may include a log adapter for each source module 14 that is particularly configured to adapt a specifically configured log data type from a particular source module to the file configuration and/or file type understandable by components of the monitoring module. For example, when there are four source modules 14, there may be four adapter modules 32 (e.g., a first log adapter 32a, a second log adapter 32b, a third log adapter 32c, and a fourth log adapter 32d) that are each configured to adapt different log data types from different source modules 14 into log data types and/or configurations readable by the monitoring module 30.

The monitoring module 30 may be configured to receive converted log data from the source modules 14 via the adapter modules 32, filter the received log data, analyze the log data, and/or store the log data into a searchable database. In some cases, the monitoring module 30 may include a log data collection module 34, a stream data analysis engine 36, a searchable database module 38, and/or one or more other suitable components.

The log data collection module 34 may be configured to receive adapted or converted log data from the source modules 14 via the adapter modules 32 and/or data from other suitable sources of log data, filter the received log data, and dispatch the received log data. The log data collection module 34 may be or may include a distributed service for collecting, aggregating, and moving log data. This may be accomplished by configuring the APACHE FLUME product, but this is not required. The log data collection module 34 may include, among other features, a log data source module 40, a log data filter module 42, and a log data sink module 44. The log data source module 40 may be configured to receive log data from the source modules 14 via the adapter modules 32, aggregate the received log data, and send the aggregated log data to the log data filter module for filtering between log data that is sent directly to the searchable database module 38, data that is sent to the stream data analysis engine 36 for analyzing, and/or data that may be sent to one or more other suitable component. In some cases, the log data filter module 42 may apply an indicator to the log data to indicate which component the log data is to be sent, and the log data and indicator may be moved to the log data sink module 44.

The log data filter module 42 may be configured to filter log data based on any suitable characteristic of the log data. In one example, the log data filter module 42 may be configured to filter log data and direct the filtered log data to the stream data analysis engine 36 if it is associated with a particular request data path. In an additional or alternative example, the log data filter module 42 may be configured to filter all log data and provide the filtered log data to the searchable database module 38, filter log data that is not associated with a request data path to the searchable database module 38, and/or filter other suitable data to the searchable database module 38.

The log data sink module 44 may be configured to send the log data to one or more of the stream data analysis engine 36, the searchable database module 38 and/or one or more other suitable component of the monitoring module 30. In some cases, the log data sink module may include or may be configured to communicate with one or more adapters configured to adapt a file type and/or configuration of log data in the log data collection module 34 to a file type and/or configuration readable by the component to which the log data is to be sent. In one example, the log data sink module 44 may include or may communicate with an analyzer sink adapter 46 configured to adapt log data into a file type or configuration readable by the stream data analysis engine 36 and/or a storage sink adapter 48 configured to adapt log data into a file type or configuration readable by the searchable database module 38.

The stream data analysis engine 36 may be configured to analyze log data according to one or more rules. In one example, the stream data analysis engine 36 may be configured to determine an amount of time it takes to process a user request, determine an amount of time it takes for a source module 14 to process a message of a sequence of messages along a request data path that are initiated in response to a user request, determine a computing efficiency of one or more source modules to processing a message of a sequence of messages along a request data path that are initiated in response to a user request, and/or perform one or more other suitable analysis.

The stream data analysis engine 36 may include a data analysis source module 50, a data analysis stream module 52, a data analysis sink module 54, and/or one or more other suitable components. The stream data analysis engine 36 may be implemented by or may include a distributed streaming platform, such as the APACHE KAFKA program, but this is not required.

The data analysis stream module 52 may be configured to receive filtered log data from the log data collection module 34 and aggregate the received log data until it is ready for processing. In one example, the received log data may be aggregated at the data analysis source module 50 until all log data entries associated with a particular tag (e.g. particular user request) have been received by the stream data analysis engine 36. Once log data is ready to be analyzed, the log data may be moved to the data analysis stream module 52 for analysis. Once the log data has been analyzed, the log data and any additional analysis data (e.g., source module performance results) may be moved to the data analysis sink module 54, which may include one or more sink adapters configured to change file types and/or configurations of the analyzed log data and the analysis data to file types and/or configurations readable by components receiving the analyzed log data and/or the analysis data. Example components receiving the analyzed log data and/or the analysis data may include, but are not limited to, the searchable database module 38 (e.g., analyzed log data and/or the analysis data), the user interface device 12 (e.g., analysis data), and/or one or more other suitable component of or communication with the building management system 10.

Figure 4:
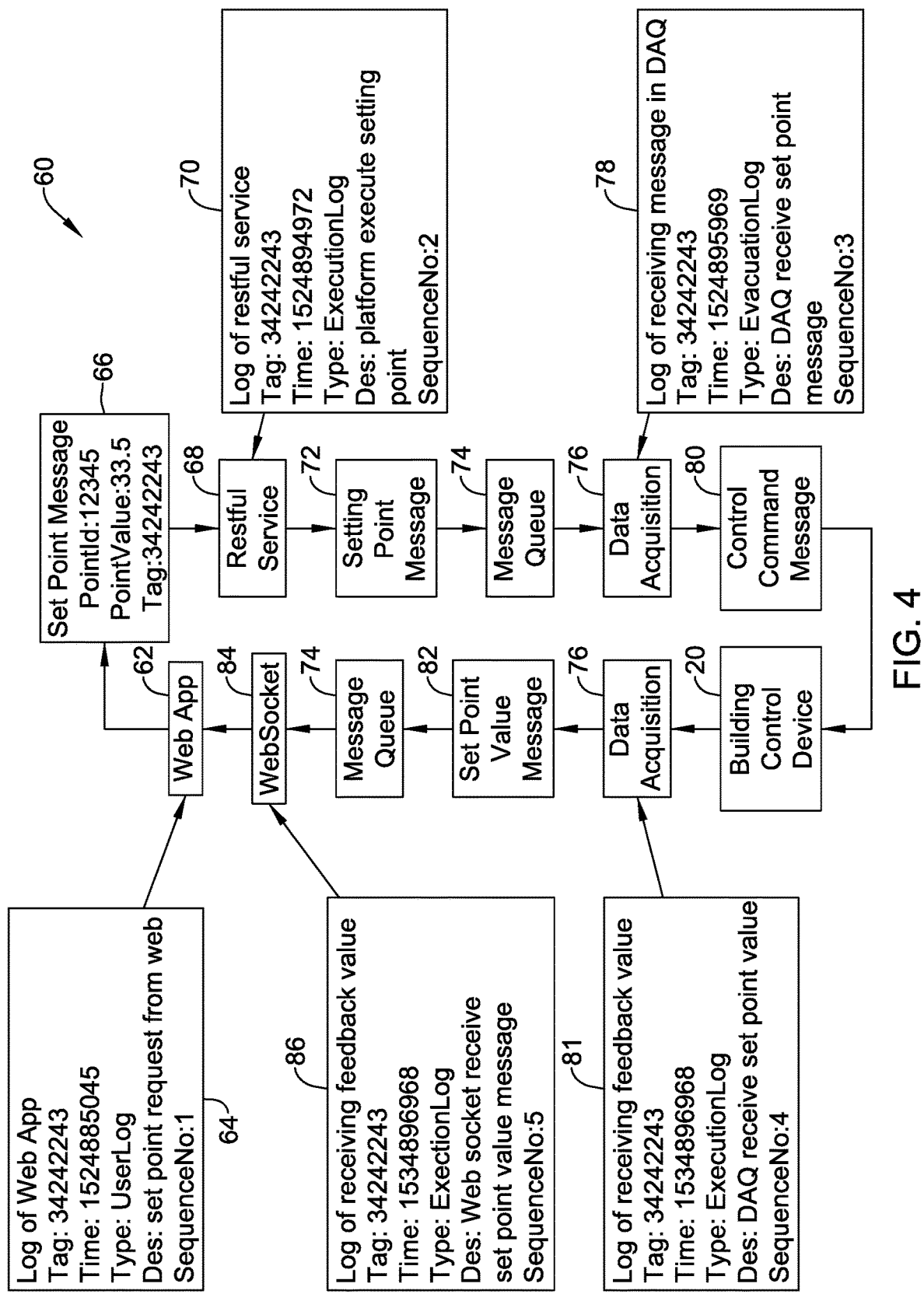
FIG. 4 is a schematic flow diagram of an illustrative request data path.
Figure 5:
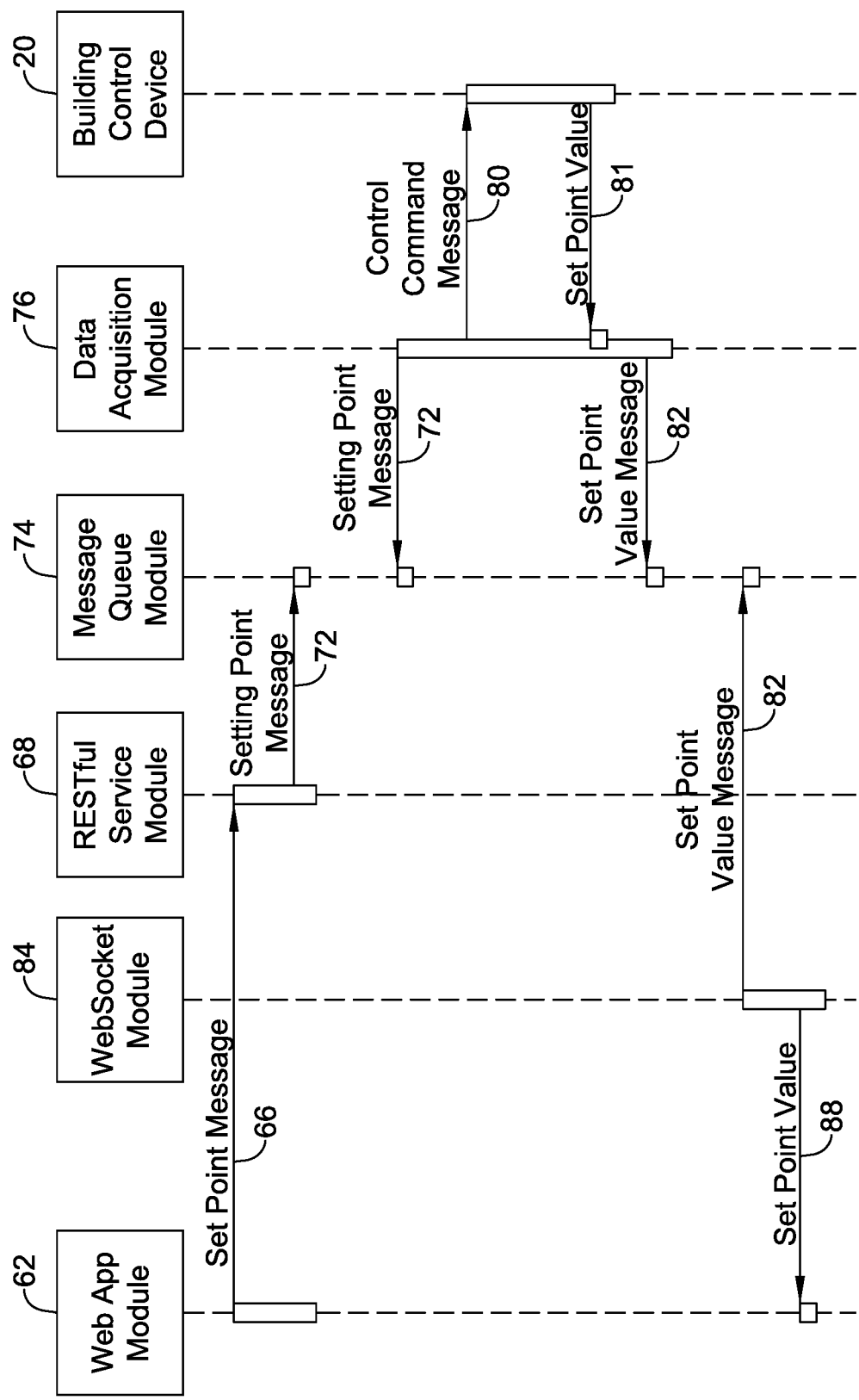
FIG. 5 is a schematic flow diagram of an illustrative functional timeline for messages in the request data path shown in FIG. 4.
Figure 6:
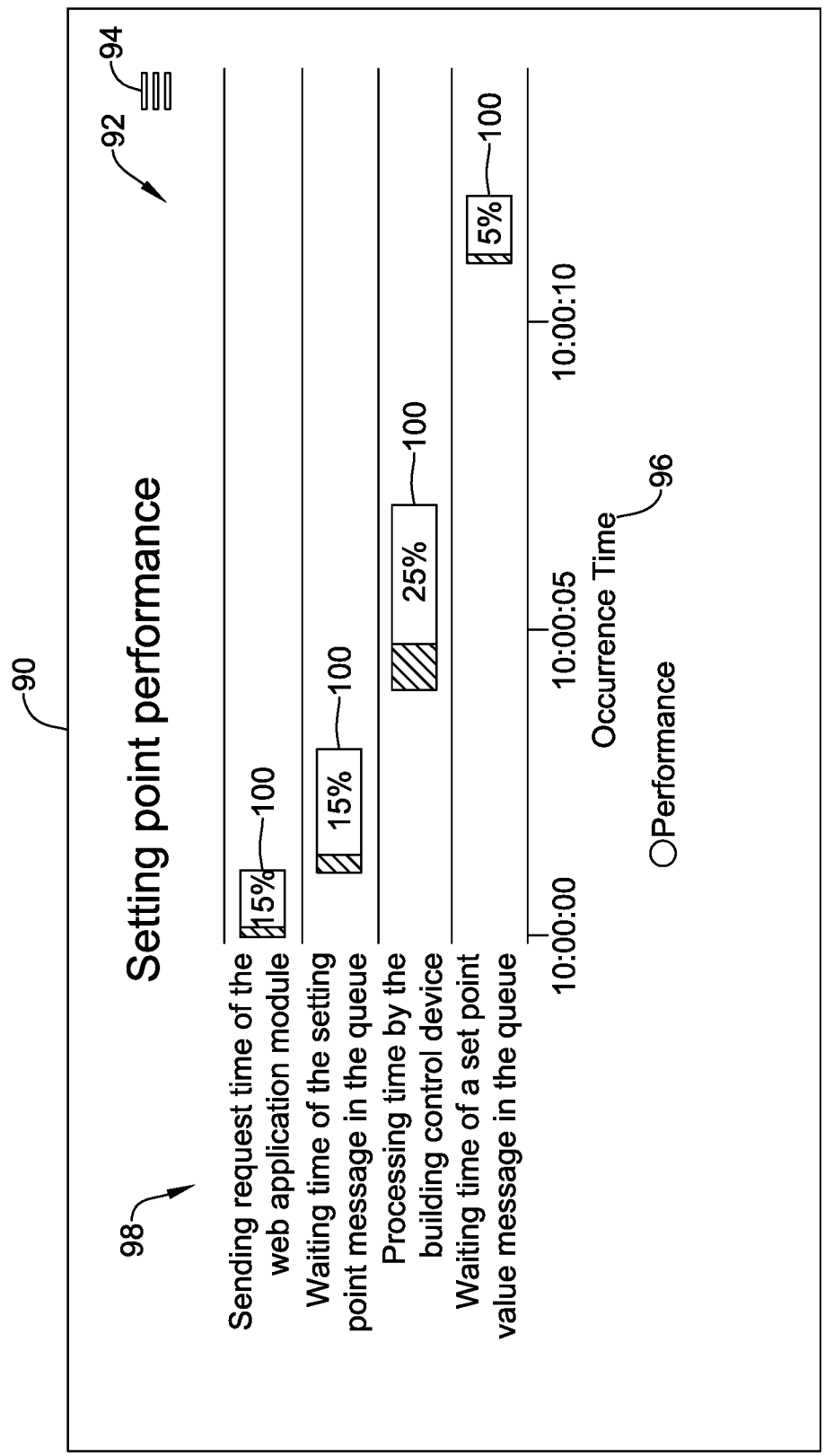
FIG. 6 is a schematic diagram of an illustrative dashboard for displaying building management system performance metrics.

The searchable database module 38 may be any suitable searchable database module configured to store data associated with the building management system 10 and allow users and/or components of the building management system 10 to search the data stored in the searchable database module 38 in a suitable manner. The searchable database module 38 may be implemented by or may include a distributed database management system, such as the APACHE CASSANDRA program, but this is not required FIGS. 4-6 schematically depict an example of a user set point request for the building management system 10, which may be monitored by the monitoring system 18. FIG. 4 depicts a schematic flow diagram of an illustrative user request data path 60 for making the user set point request. FIG. 5 depicts a schematic functional timeline chart of a sequence of messages that are generated along the request data path 60 in response to the user set point request. FIG. 6 depicts an illustrative performance chart that may be produced and displayed on a user interface in response to monitoring the building automation system response to the user's set point request.

The request data path 60 depicted in FIG. 4 may be initiated in response to a user request to change or set a set point (e.g., via the user interface device 12 and/or other suitable devices) of one or more building control devices 20. In one example, the user may provide the set point request to a web application module 62 (e.g., a source module 14) via the user interface device 12. Once the web application module 62 receives the user request, the web application module 62 may initiate the request data path 60 and create a web application log entry 64. The web application log entry 64 may include a tag value (e.g., "34242243" or other suitable tag value), which may be assigned by the web application module 62, a time stamp of when the web application module 62 processed the set point request (e.g., which may be in standard time or may be in the form of a time produced with a counter, such as "1524885045" or other suitable value), a type of log to which the log entry is added (e.g., a user log or other suitable log), a description of the processing by the web application module 62 (e.g., set point request from web or other suitable description), a sequence number of the web application module 62 in the request data path 60 (e.g., "1" due to the web application module 62 processing being the first step in the request data path 60 or other suitable value).

The web application module 62 may produce a set point message 66 to send along the request data path. The set point message 66 may include, among other data, a value for a PointId parameter (e.g., 12345 or other suitable PointId value), a value for a PointValue parameter (e.g., 33.5. or other suitable value), and the tag value established by the web application module 62. The tag value may stay constant through the messages in the sequence of messages.

The set point message 66 may be processed by a RESTful service module 68 (e.g., micro-service or other suitable source module 14). In response to processing the set point message 66, the RESTful service module 68 may create a RESTful service log entry 70. The RESTful service log entry 70 may include the common tag value (e.g., 34242243), a time stamp of when the RESTful service module 68 processed the set point message 66 (e.g., 1524894972), the type of log to which the log entry is added (e.g., an execution log), a description of the processing of the message (e.g., platform execute setting point), and a sequence number (e.g., "2" due to the RESTful service module 68 process being the second step in the request data path 60). The RESTful service module 68 may produce a setting point message 72, which may include the common tag value.

The setting point message 72 may be held in a message queue module 74 until a data acquisition module 76 (e.g., a source module 14) is able to receive/consume the setting point message 72. Once the data acquisition module 76 is ready to process the setting point message 72, the setting point message 72 may move from the message queue module 74 to the data acquisition module 76 (e.g., the data acquisition module 76 may pull the setting point message 72 from the message queue 74, but this is not required). In response to processing the setting point message 72, the data acquisition module 76 may create a data acquisition log entry 78. The data acquisition log entry 78 may include the common tag value (e.g., 34242243), a time stamp of when the data acquisition module 76 processed the setting point message 72 (e.g., 1524895969), the type of log to which the log entry is added (e.g., an execution log), a description of the processing of the message (e.g., DAQ receive setting point message), and a sequence number (e.g., "3" due to the data acquisition module 76 processing being the third step in the request data path 60). The data acquisition module 76 may produce a control command message 80, which may include the common tag value.

The control command message 80 may then be sent to a target building control device 20 and the building control device 20 may change its set point in response to the user request and/or take one or more other suitable actions. In some cases, the target building control device 20 may be a third party device and may not produce a log entry into log data that is transferred to the monitoring system 18 for analysis, but this is not required.

Once the building control device 20 has taken an action, data acquisition module 76 may detect and/or receive a report of the set point change, and log a further data acquisition log entry 81. The further data acquisition log entry 81 may include the common tag value (e.g., 34242243), a time stamp of when the data acquisition module 76 processed the change in set point by the building control device 20 (e.g., 1534896968), the type of log to which the log entry is added (e.g., an execution log), a description of the processing of the message (e.g., DAQ receives set point value), and a sequence number (e.g., "4" due to the further processing by the data acquisition module 76 being the fourth step in the request data path 60). The data acquisition module 76 may produce a set point value message 82, which may include the common tag value.

The set point value message 82 may be held in the message queue module 74 or a different suitable message queue until, for example, a web socket module 84 (e.g., a source module 14) is able to receive/consume the set point value message 82. Once the web socket module 84 is ready to process the set point value message 82, the set point value message 82 may move from the message queue module 74 to the web socket module 84 (e.g., the web socket module 84 may pull the set point value message 82 from the message queue module 74, but this is not required). In response to processing the set point value message 82, the web socket module 84 may create a web socket log entry 86. The web socket log entry 86 may include the common tag value (e.g., 34242243), a time stamp of when the web socket module 84 processed the set point value message 82 (e.g., 1534896968), the type of log to which the log entry is added (e.g., an execution log), a description of the processing of the message (e.g., web socket receives set point value message), and a sequence number (e.g., "5" due to the web socket module 84 processing being the fifth step in the request data path 60). The web socket module 84 may the report the set point value back to the user via the web application module 62.

In FIG. 5, the functional timeline chart of the sequence of messages discussed with respect to FIG. 4 depicts a further flow of the sequences of messages along the modules of the request data path that are produced in response to a user set point change request. In summary of the message flow along the request data path, as depicted in FIG. 5, the set point message 66 may move from the web application module 62 to the RESTful service module 68. The RESTful service module 68 may produce a setting point message 72 and send the setting point message 72 to the message queue module 74 and the data acquisition module 76 may pull the setting point message 72 from the message queue module 74. The data acquisition module may then produce the control command message 80 and provide the control command message 80 to the building control device 20. The data acquisition module 76 may determine the building control device 20 has changed its set point in response to receiving the set point value 81 from the building control device 20. The data acquisition module 76 may then process the set point value 81, produce the set point value message 82, and send the set point value message 82 to the message queue module 74. When the web socket module 84 is ready to process the set point value message 82, the web socket module 84 may pull the set point value message 82 from the message queue module 74. The web socket module 84 may then process the set point value message 82 and provide a set point value 88 of the building control device 20.

The monitoring system 18 may monitor the movement of messages along the request data path to determine one or more performance metrics of the building management system 10 (e.g., source modules 14, the building control devices, etc.). Example performance metrics may include resource utilization metrics such as execution time values, a total execution time value for completing a request along the data path, an execution time value for completing each step along the data path, a percentage of allotted execution time used for completing the request along the data path, a percentage of allotted execution time used for completing a step along the data path, and/or other suitable metrics.

In some cases, the stream data analysis engine 36 of the monitoring system 18 may utilize the tag value, the time stamps, and/or sequence numbers in log entries to determine performance metrics of the source modules 14 in the request data path. In one example, the stream data analysis engine 36 may determine a sending request time of the web application module 62 by subtracting the time stamp of the web application log entry 64 from the timestamp of the RESTful service log entry 70. The stream data analysis engine 36 may determine a waiting time of the setting point message 72 in the message queue module 74 by subtracting the timestamp of the RESTful service log entry 70 from the timestamp of the data acquisition log entry 78. The stream data analysis engine 36 may determine a processing time by the building control device 20 by subtracting the timestamp of the data acquisition log entry 78 from the further timestamp of the data acquisition log entry 78 indicating a set point value has been received from the building control device 20. The stream data analysis engine 36 may determine a waiting time of the set point value message 82 in the message queue module 74 by subtracting the further timestamp of the data acquisition log entry 78 indicating a set point value has been received from the building control device 20 from the timestamp of the web socket log entry 86. Other time-related performance metrics may be completed in a similar manner.

Additionally, the percentage of allotted time used for completing a step along the data path may be determined by the stream data analysis engine 36 by dividing the determined time for completing the step along the data path by an amount of time allotted for that step and multiplying by one hundred (100). The data resulting from the analysis of the log data may be sent by the stream data analysis engine 36 to the searchable database module 38 for storage and/or to the user interface device 12 for storage and/or display.

FIG. 6 depicts an illustrative dashboard 90 providing a performance chart 92 for message processing by source modules of the building management system 10, where the message processing occurs in the request data path 60. The dashboard 90 may be displayed on a screen or display of the user interface device 12 and/or other suitable display device. In some cases, the dashboard 90 may include one or more selectable features in addition to and/or alternative to the chart 92 or other suitable data presentations. In one example, as depicted in FIG. 6, the dashboard 90 may include a menu button 94, which when selected may present a user with selectable options for viewing different data, additional data, different screens, and/or other suitable options.

The performance chart 92 may depict occurrence time 96 on the x-axis and one or more functions or steps 98 along a request data path on the y-axis, with an occurrence time related performance metric 100 charted for functions or steps along the request data path. As depicted in FIG. 6, four (4) functions or steps of the request data path 60 are charted: "Sending request time of web application module", "Waiting time of the setting point message in the queue", "Processing time by the building control device", and "Waiting time of a set point value message in the queue". Additionally or alternatively, performance metrics of other functions or steps of the request data path 60 and/or other suitable data paths may be charted.

The performance metric 100 charted in the setting point performance chart 92 is a percent of allotted time it took the building management system 10 to execute or perform the step or function. The depicted performance metric 100 includes an indication of an allotted time for executing the step or function by including a rectangle that extends from a start time to an allotted end time, where the time used by the building management system 10 to execute the function or step is indicated by hash marks in the rectangle and percent of allotted time used is also indicated in the rectangle. Other suitable graphical representations of the performance metric 100 are contemplated and may be used to display desired data. As depicted in FIG. 6, fifteen percent (15%) of the allotted time was used for the sending request time of the web application function, fifteen percent (15%) of the allotted time was used for the waiting time of the setting point message in the queue, twenty-five percent (25%) of the allotted time was used for the processing time by the building control device, and five percent (5%) of the allotted time was used for the waiting time of the set point value message in the queue. The allotted time may represent the time it would take when the corresponding hardware resources are at maximum utilization.

OTHER EXAMPLES

A method of monitoring performance of a building management system, wherein the building management system includes a plurality of modules each producing log data. The method includes receiving a user request at a first one of the plurality of modules of the building management system, the user request initiating a sequence of messages that are passed between and processed by two or more of the plurality of modules along a request data path beginning with the first one of the plurality of modules. Each of the sequence of messages includes a common tag value that corresponds to the user request and that is generated by the first one of the plurality of modules. Each of the plurality of modules that process one of the sequence of messages logging the processing of the corresponding message in a log entry in log data produced by the corresponding module, the log entry including the common tag value along with a timestamp. The method then includes analyzing the log data from each of the plurality of modules that process one of the sequence of messages to identify resource utilization of at least some of the plurality of modules that process one of the sequence of messages along the request data path.

In some cases, each of the plurality of modules that process one of the sequence of messages add a sequence number to the log entry in the log data produced by the corresponding module, wherein the sequence number represents the sequence position of the corresponding module along the request data path. When so provided, analyzing the log data may include analyzing the log data based on the sequence numbers and the associated time stamps to determine a length of time that each of one or more modules in the request data path took to perform a corresponding portion of the request data path.

In some cases, analyzing the log data includes identifying a percent of a maximum capacity of resource utilization of at least some of the plurality of modules that process one of the sequence of messages along the request data path. A display may display a dashboard that presents to a user the percent of the maximum capacity of resource utilization of at least some of the plurality of modules that process one of the sequence of messages along the request data path.

In some cases, at least two of the plurality of modules that process one of the sequence of messages produce log data in different formats. When so provided, the log data may be adapted from the at least two of the plurality of modules that process one of the sequence of messages into one or more file formats readable by a log data collector. In some cases, the log data collector may filter the log data received from each of the plurality of modules that process one of the sequence of messages before analyzing the log data.

It is contemplated that the method may further include providing at least some of the log data collected by the log data collector to a searchable database, and providing at least some of the log data collected by the log data collector to a streaming data analysis engine to generate additional log entries, and providing the additional log entries to the searchable database.

In some cases, the plurality of modules of the building management system may communicate with a building control system, and in some cases, may collectively produce and deliver a command and/or request to the building control system, sometimes in response to a user request. The building control system may return a response, and the plurality of modules may collectively provide a response back to the original requester. In some cases, the user request may include a request to change a setpoint of the building control system, a request for a point value of the building control system, a request for current active alarms in the building control system, and/or any other suitable request.

Also contemplated is a monitoring system for monitoring performance of a building management system. The monitoring system may include a plurality of modules operatively coupled to a building control system. The plurality of modules may be configured such that when a first one of the plurality of modules receive a user request from a user, the first one of the plurality of modules initiates execution of the user request along a request data path to the building control system. The execution of the user request may include a sequence of messages that are each passed between two corresponding ones of the plurality of modules along the request data path, and wherein each of the sequence of messages include a common tag value that corresponds to the user request. Each of the plurality of modules logs the corresponding message in a log entry in log data produced by the corresponding module. The log entry may include the common tag value along with a timestamp. A monitoring module may be operatively coupled to the plurality of modules for analyzing the log data from each (or at least some) of the plurality of modules to identify resource utilization of at least some of the plurality of modules along the request data path.

In some cases, the monitoring module may include a log data collection module for collecting the log data from each of the plurality of modules. In some cases, the monitoring module includes a streaming data analysis engine operatively coupled to the log data collection module for analyzing at least some of the log data to generate additional log entries. The log data collection module may include a filter module for filtering the log data received from at least some of the plurality of modules resulting in filtered log data. In some cases, the monitoring module may include a streaming data analysis engine operatively coupled to the filter module for analyzing at least some of the filtered log data to generate additional log entries.

It is contemplated that the monitoring system may include a searchable database module, wherein at least some of the log data collected by the log data collection module and at least some of the additional log entries generated by the streaming data analysis engine are stored in the searchable database module.

In some cases, the monitoring system may include a plurality of different adapter modules each operatively coupled to a corresponding one of two or more of the plurality of modules. Each of the plurality of different adapter modules may be configured to convert the log data produced by the corresponding one of the plurality of modules into one or more file formats readable by the log data collection module.

Another illustrative method for monitoring performance of a building management system may include receiving at a log data collection module log data from each of one or more log adapters, wherein the one or more log adapters convert the log data from a corresponding one of the plurality of modules to one or more file formats readable by the log data collection module. The illustrative method may further include filtering the log data using the log data collection module into one of a first group of data to be stored in a searchable database and a second group of data to be further analyzed, sending the second group of data via a sink adapter to a streaming data analysis engine, and analyzing the second group of data using the streaming data analysis engine, wherein results of the analysis provide one or more execution time values that correspond to an execution time at each of two or more of the plurality of modules. In some cases, the results of the analysis are stored in the searchable database.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of monitoring performance of a building management system, wherein the building management system includes one or more of a security system, a surveillance system, a lighting system, a fire protection system and an environment control system of a building, the building management system includes a plurality of modules each producing log data, the method comprising:
receiving a user request for the building management system, the user request initiating a sequence of messages that are passed between and processed by two or more of the plurality of modules of the building management system along a request data path;
generating a common tag value to track the processing of the user request by the two or more of the plurality of modules of the building management system along the request data path;
each of the plurality of modules that process one of the sequence of messages logging the processing of the corresponding message in a log entry in log data produced by the corresponding module, the log entry includes the common tag value for tracking the processing of the user request along the request data path along with a corresponding timestamp that indicates the time at which the corresponding module processed the corresponding one of the sequence of messages; and
analyzing the timestamps identified with reference to the common tag value in the log data logged by at least some of the plurality of modules that processed one of the sequence of messages to identify a resource utilization of each of at least some of the plurality of modules of the building management system along the request data path.

2. The method of claim 1, wherein each of the plurality of modules of the building management system that process one of the sequence of messages adding a sequence number to the log entry in the log data produced by the corresponding module, wherein the sequence number represents the sequence position of the corresponding module along the request data path.

3. The method of claim 2, wherein analyzing the log data includes analyzing the log data based on the sequence numbers and the associated time stamps to determine a length of time that each of one or more modules in the request data path took to perform a corresponding portion of the request data path.

4. The method of claim 1, wherein analyzing the log data includes identifying a percent of a maximum capacity of resource utilization of at least some of the plurality of modules that process one of the sequence of messages along the request data path.

5. The method of claim 4, further comprises:
displaying a dashboard that presents to a user the percent of the maximum capacity of resource utilization of at least some of the plurality of modules that process one of the sequence of messages along the request data path.

6. The method of claim 1, wherein at least two of the plurality of modules that process one of the sequence of messages produce log data in different formats, wherein the method further comprises:
adapting the log data from the at least two of the plurality of modules that process one of the sequence of messages into one or more file formats readable by a log data collector.

7. The method of claim 6, further comprising:
filtering, via the log data collector, the log data received from each of the plurality of modules that process one of the sequence of messages before analyzing the log data.

8. The method of claim 6, further comprising:
providing at least some of the log data collected by the log data collector to a searchable database;
providing at least some of the log data collected by the log data collector to a streaming data analysis engine to generate additional log entries, and then providing the additional log entries to the searchable database.

9. The method of claim 1, wherein the building management system includes the plurality of modules coupled to a building control system of the building management system.

10. The method of claim 9, wherein the user request comprises a request to change a setpoint of the building control system.

11. The method of claim 9, wherein the user request comprises a request for a point value of the building control system.

12. A monitoring system for monitoring performance of a building management system, wherein the building management system includes one or more of a security system, a surveillance system, a lighting system, a fire protection system and an environment control system of a building, the monitoring system comprising:
a plurality of modules operatively coupled to a building control system of the building management system;
wherein the plurality of modules are configured such that when a first one of the plurality of modules receive a user request from a user, the first one of the plurality of modules initiates execution of the user request along a request data path, the execution of the user request includes a sequence of messages that are each passed between two corresponding ones of the plurality of modules along the request data path, and wherein each of the sequence of messages include a common tag value that corresponds to the user request;
each of the plurality of modules logs a log entry that corresponds to the corresponding message in log data produced by the corresponding module, the log entry including the common tag value along with a timestamp; and
a monitoring module for analyzing the log data from each of the plurality of modules to identify resource utilization of at least some of the plurality of modules along the request data path, the monitoring module including:
a log data collection module for collecting the log data from each of the plurality of modules;
a filter module for filtering the log data received from at least some of the plurality of modules resulting in filtered log data; and
a streaming data analysis engine operatively coupled to the filter module for analyzing at least some of the filtered log data to generate additional log entries.

13. The monitoring system of claim 12, wherein the monitoring module uses one or more of the additional log entries to identify resource utilization of at least one of the plurality of modules along the request data path.

14. The monitoring system of claim 13, further comprising a plurality of different adapter modules each operatively coupled to a corresponding one of two or more of the plurality of modules, each of the plurality of different adapter modules configured to convert the log data produced by the corresponding one of the plurality of modules into one or more file formats readable by the log data collection module.

15. The monitoring system of claim 12, wherein the monitoring module uses the common tag value to identify log entries that are relevant to the execution of the user request along the request data path.

16. The monitoring system of claim 12, wherein the monitoring module analyzes the timestamps identified with reference to the common tag value in the log data that is associated with the user request to identify the resource utilization of each of at least some of the plurality of modules of the building management system along the request data path.

17. The monitoring system of claim 16, wherein identifying the resource utilization of at least one of the plurality of modules of the building management system includes subtracting the timestamps logged by two of the plurality of modules along the request data path.

18. The monitoring system of claim 12, further comprising a searchable database module, wherein at least some of the log data collected by the log data collection module and at least some of the additional log entries generated by the streaming data analysis engine are stored in the searchable database module.

19. A method of monitoring performance of a building management system, wherein the building management system includes a plurality of modules for processing a user request, each of the plurality of modules producing log data, the method comprising:
receiving at a log data collection module log data from each of one or more log adapters, wherein the one or more log adapters convert the log data from a corresponding one of the plurality of modules to one or more file formats readable by the log data collection module;
filtering the log data using the log data collection module into one of a first group of data to be stored in a searchable database and a second group of data to be further analyzed;
sending the second group of data via a sink adapter to a streaming data analysis engine;
analyzing the second group of data using the streaming data analysis engine, wherein results of the analysis provide one or more execution time values that correspond to an execution time at each of two or more of the plurality of modules.

20. The method of claim 19, wherein the results of the analysis are stored in the searchable database.

\* \* \* \* \*